United States Patent [19]

Uno et al.

[11] Patent Number: 4,702,346

[45] Date of Patent: Oct. 27, 1987

[54] VIBRATION INSULATOR

[75] Inventors: Takaaki Uno, Kawasaki; Takuya Dan; Michihiro Orikawa, both of Yokohama, all of Japan

[73] Assignees: Nissan Motor Co., Ltd.; Bridgestone Corporation, both of Japan

[21] Appl. No.: 865,970

[22] Filed: May 22, 1986

[30] Foreign Application Priority Data

May 27, 1985 [JP] Japan ................... 60-112155

[51] Int. Cl.$^4$ .............................................. F16F 1/36
[52] U.S. Cl. .................................. 181/207; 267/140.1
[58] Field of Search .............................. 181/207-209; 248/562, 636; 267/140.1

[56] References Cited

U.S. PATENT DOCUMENTS

| | | | |
|---|---|---|---|
| 3,698,703 | 10/1972 | Hipsher | 248/562 X |
| 4,595,867 | 6/1986 | Cognevich, Sr. et al. | 318/588 |
| 4,630,806 | 12/1986 | Dan et al. | 267/140.1 |

FOREIGN PATENT DOCUMENTS

| | | |
|---|---|---|
| 2551161 | 3/1985 | France . |
| 48-36151 | 11/1973 | Japan . |
| 56-164242 | 12/1981 | Japan . |

OTHER PUBLICATIONS

Abstract of Japanese 60-34541, Elastic Bushing, 7/6/85, vol. 9/No. 162.

*Primary Examiner*—Benjamin R. Fuller.
*Attorney, Agent, or Firm*—Leydig, Voit & Mayer

[57] ABSTRACT

An annular element is disposed within an outer tubular member of an insulator device in a manner to surround a recessed elastomeric body interposed between the outer tubular member and an inner tubular member. A channel formed in the outer periphery of the annular element is closed by the outer tubular member to define a passage which fluidly intercommunicates chambers defined by the recesses formed in the elastomeric body. The channel is sufficiently long and robust as to ensure the desired vibration damping and working life of the unit.

12 Claims, 7 Drawing Figures

VIBRATION INSULATOR

BACKGROUND OF THE INVENTION

1. Field of the Invention

The present invention relates generally to a vibration insulator for use in automotive vehicles and the like and more specifically to an insulator which damps vibration by pumping a working fluid from one chamber to another through a flow resistance.

2. Description of the Prior Art

FIGS. 1 and 2 of the drawings show an insulator arrangement disclosed in Japanese Patent Provisional Publication No. 48-35151(1973) (based on U.S. patent application Ser. No. 755,268 filed on Aug. 26, 1968 now U.S. Pat. No. 4,595,867. This arrangement comprises two co-axially arranged tubular members 1, 2 which are interconnected by an elastomeric body 4 disposed therebetween and fixedly secured thereto.

A plurality (two) of recesses 6, 6 are formed in the outer periphery of the elastomeric body 4. These recess are closed by the outer tubular member 2 in a manner to define chambers 8, 8 which are filled with an incompressible working fluid.

A generally diametrically disposed straight channel defines a passage 10 which is formed through the elastomeric body per se in a manner to establish fluid communication between the chambers 8, 8. As shown in FIG. 2 this passage 10 is relatively small in diameter with respect to the inner tubular member 1.

With this construction when the outer tubular member 2 (for example) is subject to vibration the relative motion between the inner and outer tubular members 1, 2 in a direction normal to the axes thereof distorts the elastomeric body 4 in a manner which causes fluid to be to pumped from one chamber to the other via passage 10.

This arrangement while being simple in structure and relatively easy to produce, has suffered from the drawbacks that as the passage 10 which interconnects the chambers extends directly from one chamber to the other in a generally diametrical fashion through the elastomeric body 4, the length of passage 10 tends to be relatively short. This results in a limited vibration damping capacity. Further, due to the formation of the passage 10 in the elastomeric body 4 it is difficult to control the dimensions of the passage during mass production within desired limits.

Another problem comes in that during operation, as the passage 10 is defined in the elastomeric body 4 per se, the flow of working fluid through the passage tends to errode the walls thereof relatively quickly thus reducing the working life of the unit.

SUMMARY OF THE INVENTION

It is an object of the present invention to establish a vibration insulator which features a rigid structure providing a curved passage which has an effective length capable of providing the desired vibration damping effect and which exhibits a suitably long working life.

It is a further object of the present invention to provide an insulator wherein the dimensions of the rigid walls comprising the passage can be controlled within predetermined control limits during production of the unit.

In brief, the above objects are achieved by an arrangement wherein an annular element is disposed within an outer tubular member of the insulator in a manner to surround a recessed elastomeric body interposed between the outer tubular member and an inner one. A curved channel formed in the outer periphery of the annular element is closed by the outer tubular member to define a passage. The passage fluidly intercommunicates chambers defined in the recesses formed in the elastomeric body and is sufficiently long and robust in construction as to ensure the desired vibration damping and working life of the unit.

More specifically, the present invention takes the form of a vibration insulator comprising: an inner tubular member; an elastomeric body secured to the inner tubular member; first and second discrete recesses in the elastomeric body; an outer tubular member which is disposed about the elastomeric body in a manner which closes the first and second recesses thus defining first and second discrete chambers; an annular element disposed within the outer tubular member surrounding the elastomeric body; curved channel in the outer periphery of the annular member, the channel being closed by the outer tubular member to define a passage which fluidly communicates the first and second chambers.

DETAILED DESCRIPTIPTION OF THE PREFERRED EMBODIMENTS

Figure 3:
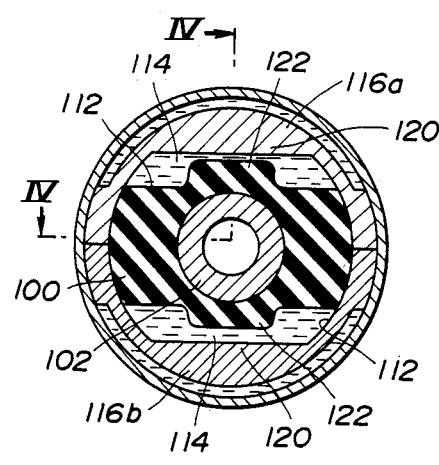
FIG. 3 is a sectional view of a first embodiment of the present invention.
Figure 4:
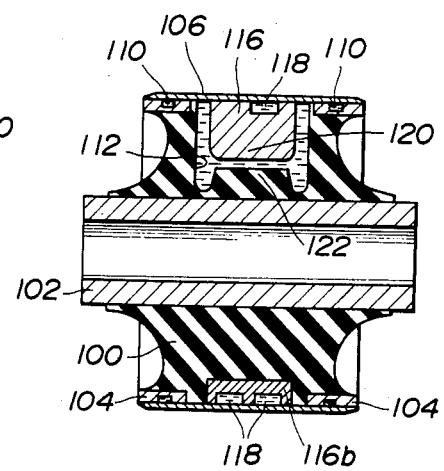
FIG. 4 is a sectional view taken along section line IV—IV of FIG. 3.

FIGS. 3 and 4 show a first embodiment of the present invention. In this arrangement an elastomeric body 100 formed of rubber or like elastomer is fixedly secured to an inner tubular member 102 by means of vulcanizing or a similar bonding technique.

Vulcanized or similarly fixed to the axial ends of the elastomeric body 100 are annular sealing rings 104. These rings 104 are arranged to be press fitted into an outer tubular member 106. To ensure a hermetic seal the sealing rings 104 are provided with grooves 108 (see FIG. 5) about their outer peripheries in which O-rings 110 are received.

The elastomeric body 100 is formed with shaped recesses 112 which are closed by the outer tubular member 106 and sealing rings 104 in a manner to define closed fluid chambers 114.

Located within the outer tubular member 106 and about the elastomeric body 100 is an annular member or element 116. In this embodiment this element is formed in first and second semi-cylindrical halves 116a, 116b so as to facilitate ready assembly. By way of example, these halves may be vulcanized or similarly bonded in place on the elastomeric body 100 along with the sealing rings 104 to form an intermediate element of the nature shown in FIG. 5 which then can be fitted into the outer tubular member 106 completing the insulator unit.

The outer periphery of element 116 is formed with a helical channel 118 (see FIG. 5) which is closed by the outer cylindrical member 106 in a manner to define a fluid transfer passage. This passage fluidly intercommunicates the chambers 114, 114.

During production the chambers 114 and the passage structure which interconnects the same are competely filled with a suitable working fluid.

It will be noted at this point that the annular element 116 (116a, 116b) and sealing rings 104 may be formed of any suitable rigid material such as aluminium or the like.

Each half of the annular element 116 is formed with a stopper member or section 120 which extends radially into a chamber 114 in a manner to juxtapose a radially outwardly extending projection 122 formed integrally with the elastomeric body 100. In this embodiment a clearance is defined between each stopper section and each projection when the elastomeric body 100 assumes an undistorted configuration. This construction limits the amount of relative displacement which can occur between inner and outer tubular members 102, 106 in the radial direction.

With the above disclosed arrangement when vibration is applied to one of the inner and outer tubular members in a direction normal to the axes thereof (viz., the above mentioned radial direction), as the length of the passage which interconnects the chambers is quite long as compared with the prior art, a notably improved amount of vibration damping is achieved.

Figure 5:
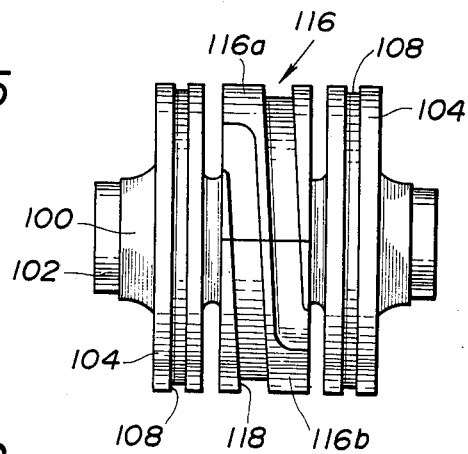
FIG. 5 is a side elevation showing a partially assembled view of the first embodiment (viz., without the outer annular or tubular member) which reveals the characterizing passage structure of the present invention.

The passage extends about the full inner circumference of the outer tubular member and has an effective length longer than the circumference of the annular element as shown in the embodiment of FIG. 5.

Figure 1:
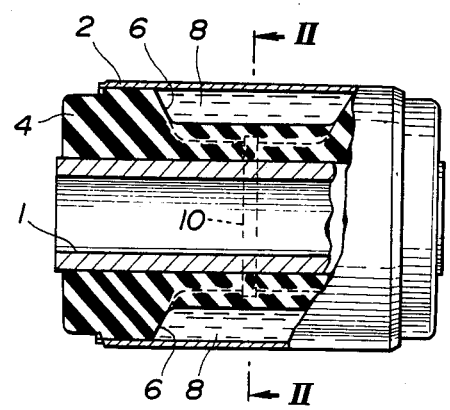
FIG. 1 is a sectional view of the prior art arrangement discussed in the opening paragraphs of the instant disclosure.
Figure 2:
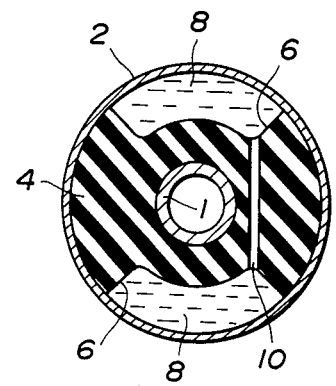
FIG. 2 is a sectional view taken along section line II—II of FIG. 1.
Figure 6:
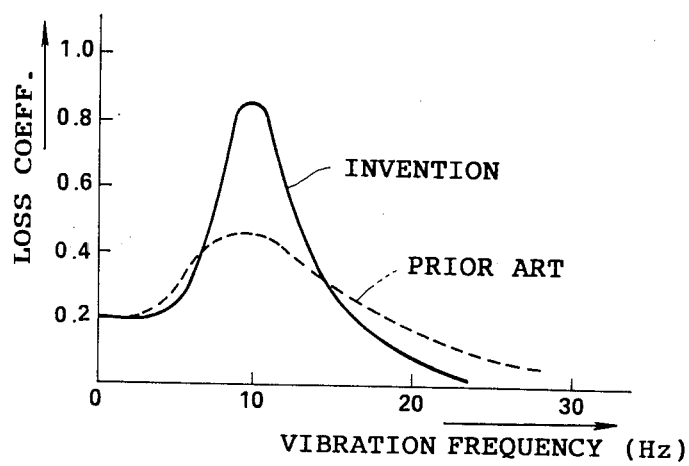
FIG. 6 is a graph showing in terms of loss coefficient and vibration frequency the vibration attenuation characteristics achieved with the present invention (solid line) and those achieved with the prior art arrangement of FIGS. 1 and 2 (chain line)

FIG. 6 of the drawings graphically demonstrates the difference in the vibration damping characteristics achieved with the arrangement disclosed in FIGS. 1 and 2 and that possible with the first embodiment of the present invention. The damping characteristics possible with the present invention are as shown in solid line. As will be appreciated with this embodiment of the present invention at the resonance frequency, which in this instance has been arranged to occur in the low frequency range at approximately 10 Khz (similar to the prior art arrangement), the amount of vibration attenuation is approximately twice that possible with the known device.

Figure 7:
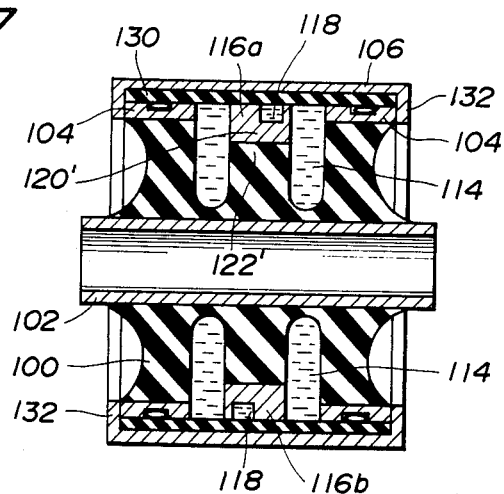
FIG. 7 is a sectional view of a second embodiment of the present invention.

FIG. 7 shows a second embodiment of the present invention. This embodiment is essentially the same as the first one and differs in that a liner 130 of elastomeric material is disposed between the sealing rings 104 and outer tubular member 106. This liner 130 improves the sealing of the unit as a whole. The outer tubular member 106 is additionally formed with radially inwardly depending flanges 132 which engage the outermost edges of the sealing rings 104. This provision ensures that sealing rings do not slip out of position with the passing of time and increases the structural rigidity of the unit as a whole.

This embodiment also features an arrangement wherein stopper sections 120' and the radially outwardly extending projections 122' of the elastomeric body are arranged in contact with one another. This increases the spring constant of the device.

Even with the provision of the liner 130 the reduction in the diameter of the annular element 116 is not great and the effective length of the passage which interconnects the chambers is still adequately long to ensure that the desired degree of damping is provided.

With the embodiments of the present invention by appropriately selecting the cross sectional area and length of the channel 118 which defines the interconnecting passage it is possible to adjust the frequency at which maximum damping effect is produced.

In the illustrated embodiments only two chambers are provided. However, as will be readily appreciated the present invention is not limited to two and a plurality of such chambers and/or passage structures may be provided if so desired.

With the present invention the provision generally of a curved passage or, more specifically, the provision of a helical or serpentine shaped passage enables the realization of a passage which is long enough to provide the required damping characteristics. Forming the passage from cooperating elements made from rigid materials (e.g., the annular element and the outer tubular member) provides rigid passage walls which are not readily erroded by the flow of working fluid therethrough.

As an alternative construction to the first embodiment it is possible to form the channel in the inner periphery of the outer tubular member 106 and close this channel using an annular element having a continuous peripheral face having no recess.

What is claimed is:

1. A vibration insulator comprising:
   a rigid inner tubular member having an outer circumference;
   a rigid outer tubular member having an inner circumference;
   an elastomeric body disposed between, and secured to, the outer circumference of said inner tubular member and the inner circumference of said outer tubular member, said elastomeric body being formed with recesses therein;
   means including said recesses defining at least first and second closed fluid chambers which hold a working fluid; and
   fluid passage defining means providing a curved channel having rigid walls and extending circumferentially about the full inner circumference of said outer tubular member to connect said chambers and provide fluid communication therebetween, whereby vibrations producing relative motion between said inner and outer tubular members distorts said elastomeric body and causes working fluid to flow between said fluid chambers through said channel, which has an effective length to dampen the vibrating flow of working fluid through said channel.

2. An insulator as claimed in claim 10 said fluid passage defining means comprising a rigid annular element disposed within said rigid outer tubular member and surrounding said elastomeric body, said rigid annular member having said curved channel formed in an outer periphery thereof, said channel being closed by said outer tubular member to define a passage which fluidly communicates said closed fluid chambers.

3. A vibration insulator according to claim 2 wherein said annular member includes first and second stopper portions which project into said first and second chambers and wherein said elastomeric body is formed with first and second projections which contact and deform against said first and second stopper portions respectively, when said inner and outer tubular members are moved in a predetermined relationship with respect to one another.

4. A vibration insulator according to claim 3, wherein said first and second stopper portions and said first and second projections are arranged to define a gap therebetween when said elastomeric body assumes an undistorted configuration.

5. A vibration insulator according to claim 3, wherein said first and second stopper portions and said first and second projections are arranged in constant contact with one another.

6. A vibration insulator according to claim 2, further comprising a liner of elastomeric material disposed on the inner periphery of said outer tubular member and interposed between said annular element and said outer tubular member.

7. Vibration insulator claim 2, wherein said annular element is formed in first and second halves.

8. Fluid chamber defining means according to claim 2 comprising first and second discrete recesses formed in said elastomeric body, said recesses being surrounded and closed by said outer tubular member defining first and second discrete fluid chambers.

9. A vibration insulator according to claim 1 wherein said inner tubular member is coaxially disposed within said outer tubular member when said elastomeric body assumes an undistorted configuration.

10. A vibration insulator comprising:
a rigid inner tubular member;
a rigid outer tubular member;
an elastomeric body disposed between, and secured to, said inner and outer tubular members, said elastomeric body being formed with recesses therein;
means including said recesses defining at least first and second closed fluid chambers which hold a working fluid; and
fluid passage defining means providing a curved channel having rigid walls and extending circumferentially about an inner circumference of said rigid outer tubular member to connect said chambers and provide fluid communication therebetween, said curved channel having a substantially helical configuration.

11. A vibration insulator according to claim 1 wherein said rigid walls of said curved channel cooperate to form a passage having a predetermined cross section to provide, in combination with a predetermined effective length, a predetermined vibration attenuation characteristic.

12. A vibration insulator comprising:
a rigid inner tubular member;
a rigid outer tubular member;
an elastomeric body disposed between, and secured to, said inner and outer tubular members, said elastomeric body being formed with recesses therein;
means including said recesses defining at least first and second closed fluid chambers which hold a working fluid; and
fluid passage defining means comprising:
a rigid annular element disposed within said rigid outer tubular member and circumferentially surrounding said elastomeric body;
a curved channel formed in an outer circumference of said rigid annular element, said curved channel being closed by said outer tubular member to define a circumferential passage which fluidly communicates said closed fluid chambers, said curved channel having an effective length longer than the circumference of said rigid annular element, whereby vibrations producing relative motion between said inner and outer tubular members distorts said elastomeric body and causes working fluid to flow between said fluid chambers through said channel, which has an effective length to dampen the vibrating flow of working fluid through said channel.

* * * * *